(12) United States Patent
Matsuyama

(10) Patent No.: US 7,236,223 B2
(45) Date of Patent: Jun. 26, 2007

(54) LIQUID CRYSTAL DISPLAY DEVICE WITH CURVED ALIGNMENT SURFACE

(75) Inventor: Hiroaki Matsuyama, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/823,023

(22) Filed: Apr. 13, 2004

(65) Prior Publication Data

US 2004/0189914 A1     Sep. 30, 2004

Related U.S. Application Data

(62) Division of application No. 09/384,186, filed on Aug. 27, 1999, now Pat. No. 6,774,974.

(30) Foreign Application Priority Data

Aug. 28, 1998   (JP)   ............................. 10-242740

(51) Int. Cl.
G02F 1/1333    (2006.01)
G02F 1/1339    (2006.01)
G02F 1/1343    (2006.01)

(52) U.S. Cl. .................... 349/123; 349/155; 349/143

(58) Field of Classification Search ................ 349/123, 349/155, 143
See application file for complete search history.

(56) References Cited

U.S. PATENT DOCUMENTS

| | | | |
|---|---|---|---|
| 3,834,792 A | | 9/1974 | Janning |
| 4,342,030 A | * | 7/1982 | Shanks ........................ 345/38 |
| 4,938,569 A | | 7/1990 | Tsunoda et al. |
| 5,289,174 A | | 2/1994 | Suzuki |
| 5,499,128 A | * | 3/1996 | Hasegawa et al. .......... 349/155 |
| 5,576,860 A | * | 11/1996 | Nakamura et al. .......... 349/113 |
| 5,795,629 A | * | 8/1998 | Harada et al. ............. 428/1.23 |
| 5,986,729 A | * | 11/1999 | Yamanaka et al. ............ 349/79 |
| 6,061,117 A | * | 5/2000 | Horie et al. ................. 349/156 |
| 6,097,459 A | | 8/2000 | Shimada et al. |
| 6,097,462 A | | 8/2000 | Koe |
| 6,211,937 B1 | * | 4/2001 | Miyachi et al. ............. 349/156 |
| 6,330,048 B1 | | 12/2001 | Shiomi et al. |
| 6,344,883 B2 | * | 2/2002 | Yamada et al. ............... 349/32 |

(Continued)

FOREIGN PATENT DOCUMENTS

JP      7-318940      12/1995

(Continued)

*Primary Examiner*—Andrew Schechter
*Assistant Examiner*—Hoan Nguyen
(74) *Attorney, Agent, or Firm*—Scully, Scott, Murphy & Presser, P.C.

(57) ABSTRACT

A multi-domain alignment liquid crystal display device in which liquid crystal molecules are aligned through a simple process and panel gap is maintained in stable fashion includes a first plate having a thin-film transistor provided at each point of intersection of a scanning line and signal line, a pixel electrode connected to the thin-film transistor and a first orientation layer formed on the pixel electrode and defining a curved surface, and a second plate having RGB color layers, an counterelectrode provided so as to oppose the pixel electrode, and a second orientation layer. A columnar spacer for regulating the panel gap is provided between the two opposing plates, and liquid crystal is sandwiched between the two plates and subjected to multi-domain alignment by the first orientation layer having the curved surface and the columnar spacer.

14 Claims, 8 Drawing Sheets

U.S. PATENT DOCUMENTS

| | | | |
|---|---|---|---|
| 6,356,335 B1 * | 3/2002 | Kim et al. | 349/156 |
| 6,512,564 B1 * | 1/2003 | Yoshida et al. | 349/124 |

FOREIGN PATENT DOCUMENTS

| | | | |
|---|---|---|---|
| JP | 8-292423 | | 11/1996 |
| JP | 9-21913 | | 1/1997 |
| JP | 9-80399 | | 3/1997 |
| JP | 9-304757 | | 11/1997 |
| JP | 411109367 A | | 4/1999 |
| JP | 411160716 | * | 6/1999 |
| JP | 411607716 A | * | 6/1999 |
| JP | 411174467 A | | 7/1999 |
| JP | 02000019527 A | | 1/2000 |
| JP | 02000193984 A | | 7/2000 |

* cited by examiner

LIQUID CRYSTAL DISPLAY DEVICE WITH CURVED ALIGNMENT SURFACE

CROSS REFERENCE TO RELATED APPLICATION

The present application is a divisional of application Ser. No. 09/384,186, filed on Aug. 27, 1999 now U.S. Pat. No. 6,774,974.

FIELD OF THE INVENTION

This invention relates to a liquid crystal display device and, more particularly, to a liquid crystal display device of the "divided alignments type", generally termed as multi-domain alignment (particularly, multi-domain-vertical-alignment) in which, by aligning the liquid crystal molecules differently in each domain within a single pixel, the visual-angle characteristics of the respective domains compensate for each other to provide a wide viewing-angle characteristic.

BACKGROUND OF THE INVENTION

Widely known examples of liquid crystal display devices include those of the twisted nematic (TN) type and those which employ electrically-controlled birefringence (ECB). However, a problem with these conventional devices is that since the alignments of the liquid crystal molecules aligning under application of a voltage are uniform within a pixel, tonality differs depending upon the angle of view. A technique (multi-domain alignment) through which the directions of alignment of liquid crystal molecules in a single pixel are made to differ is available as a method of improving upon the visual-angle characteristic. With a liquid crystal device of this kind, the visual-angle characteristics of the multi-domains compensate for each other, as a result of which the characteristic is improved.

Multi-domain alignment methods are described in the specifications of Japanese Patent Kokai Publication JP-A-Nos. 7-318940, 8-292423, 9-80399, 9-304757 and 9-21913. These examples of the prior art place surrounding walls about a pixel and regulate the alignment of the wall surfaces to thereby realize an alignment that is symmetrical with respect to an axis perpendicular to a plate (substrate) at the center of the area surrounded by the walls. Multi-domain alignment is achieved as a result. Alternatively, protruding and recessed portions having axial symmetry with respect to the above-mentioned axis of symmetry are formed to correspond to the pixel, whereby similar multi-domain alignment is achieved. The art set forth in the specification of Japanese Patent Kokai Publication JP-A-8-292423 will be described with reference to FIG. 6. FIG. 6 is a sectional view showing one pixel of a conventional liquid crystal display device. As shown in FIG. 6, walls 23, 24 each comprising a resist or the like are formed on a plate 1 so as to surround a pixel electrode 22, and a recessed portion 25 consisting of a resist film is formed between the walls 23 and 24. A counterelectrode 26 is provided on a plate 2 on the opposite side of the device, and a projecting portion 27 is formed on the counterelectrode 26. The plates 1, 2 are arranged to oppose each other in such a manner that the recessed and projecting portions 25, 26 will have common axes of symmetry. If the gap between the plates 1, 2 is filled with a mixture of at least liquid crystal and a hardening resin and the liquid crystal and hardening resin are caused to undergo phase separation, a liquid crystal area will develop in such a manner that the liquid crystal precipitates in the recess 25 or surrounds the protrusion 27. When this occurs, the liquid crystal molecules in the vicinity of the recess 25 or in the vicinity of the protrusion 27 become oriented with axial symmetry, such as in radiating form or in the form of concentric circles, with the axis being perpendicular to the plates.

SUMMARY OF THE DISCLOSURE

In the course of investigations toward the present invention, various problems have been encountered. Particularly a number of problems arise with the example of the prior art described above.

A first problem is that distribution of spacers (spheres etc.) generally used to maintain the panel gap between the plates is inappropriate. The reason for this is that the presence of spacers in the pixel areas tends to provide nuclei resulting in poor liquid crystal alignment, thereby greatly degrading the display characteristic. In contrast, if the spacers would be provided at portions where there are no pixels in order to avoid the problem of poor alignment, this increases the number of process steps.

A second problem is the requirement of process steps for mixing the hardening resin with the liquid crystal and causing phase separation and curing after the panel is filled. As a result, process load for forming the liquid crystal alignment is great.

Accordingly, an object of the present invention is to provide a multi-domain alignment liquid crystal display device in which regulation of the alignment of liquid crystal molecules is carried out through a simple process and panel gap can be maintained in stable fashion.

According to a first aspect of the present invention, there is provided a novel active-matrix liquid crystal display device. The device comprises generally first and second transparent insulating plates arranged to oppose each other, the first plate having disposed thereon a plurality of scanning lines and a plurality of signal lines, thin-film transistors provided in the vicinity of intersections between the scanning lines and signal lines, and pixel electrodes connected to the thin-film transistors, the second plate having a black matrix provided with openings at areas that oppose the pixel electrodes, a color layer and counterelectrodes provided so as to oppose the pixel electrodes, a liquid crystal sandwiched between the opposing first and second plates being control led by voltage impressed across the pixel electrodes and counterelectrodes. Further an orientation layer is provided on the pixel electrodes of the first plate via an insulating film, the orientation layer being formed into a curved surface and causing molecules of the liquid crystal to become oriented in a direction normal to the curved surface of the orientation layer, and columnar spacers for regulating panel gap are provided between the two opposing plates. Particularly, each pixel is provided with one spacer.

In the first aspect of present invention, each columnar spacer has an end portion on one side thereof that preferably is disposed approximately at the center of the orientation layer formed on the first plate.

In a case where the orientation layer formed on the first plate defines a cavity recessed toward the side of the first plate in a cross section taken along a normal to the plate, the diameter of the columnar spacer becomes progressively smaller in the direction toward the second plate.

In a case where the orientation layer formed on the first plate defines a protrusion directed toward the side of the second plate in a cross section taken along a normal to the plate, the diameter of the columnar spacer becomes progressively larger in the direction toward the second plate.

According to a second aspect of the present invention, there is provided an active-matrix liquid crystal display device generally comprising first and second transparent insulating plates arranged to oppose each other, the first plate having disposed thereon a plurality of scanning lines and a plurality of signal lines, thin-film transistors provided in the vicinity of intersections between the scanning lines and signal lines, and pixel electrodes connected to the thin-film transistors, the second plate having a black matrix provided with openings at areas that oppose the pixel electrodes, a color layer and counterelectrodes provided so as to oppose the pixel electrodes, a liquid crystal sandwiched between the opposing first and second plates being control led by voltage impressed across the pixel electrodes and counterelectrodes. Further, the pixel electrodes on the first plate and an orientation layer formed on the pixel electrodes define curved surfaces, and columnar spacers for regulating panel gap are provided between the two opposing plates.

In the second aspect of the present invention, the alignment (orientation) layer is formed, e.g., by oblique vapor deposition of SiO, and molecules of the liquid crystal are oriented substantially at right angles to the plane of the plate.

Each of the columnar spacers has an end portion on one side thereof that preferably is disposed approximately at the center of the pixel electrode formed on the first plate.

In a case where the pixel electrode formed on the first plate defines a cavity recessed toward the first plate in a cross section taken along a normal to the plate, the diameter of the columnar spacer becomes progressively larger (or smaller) in the direction toward the second plate.

In a case where the pixel electrode formed on the first plate defines a protrusion directed toward the second plate in a cross section taken along a normal to the plate, the diameter of the columnar spacer becomes progressively smaller (or larger) in the direction toward the second plate.

According to a third aspect, there is provided a multi-domain alignment active-matrix liquid crystal display device comprising: first and second transparent plates arranged to oppose each other; a liquid crystal being sandwiched between the first and second plates, and pixel electrodes disposed on one of the plates and counterelectrodes disposed on the other of the plates and adapted to apply voltage to the liquid crystal across the pixel electrodes and the counterelectrodes;

wherein an orientation layer is provided on each pixel electrode of one of said plates via an insulating film, wherein the orientation layer is formed into a curved or slanted surface so as to orient molecules of the liquid crystal in a direction normal to the curved or slanted surface of said orientation layer, and wherein columnar spacers are provided between the two opposing plates for regulating a panel gap between the plates.

The columnar spacers are disposed approximately at a center of the orientation layer on a pixel. The orientation layer defines a cavity recessed toward one of said plates. The columnar spacer has a side wall adapted to assist alignment of the liquid crystal molecules oriented by the orientation layer to secure multi-domain alignment thereof. The orientation layer defines a protrusion or recess directed toward one of said plates.

According to a fourth aspect of the present invention, there is provided a multi-domain alignment active-matrix liquid crystal display device comprising like components as in the third aspect, provided that an orientation layer is provided on each pixel electrode of one of the plates, wherein the orientation layer and the pixel electrode are formed into a curved or slanted surface;

wherein columnar spacers are provided between the two opposing plates for regulating a panel gap between the plates.

According to a fifth aspect, there is provided a multi-domain alignment active-matrix liquid crystal display device comprising the components as in the third aspect, provided that an orientation, layer is provided at least on each pixel electrode disposed on one of the plates, and that columnar spacers are provided between the two opposing plates for regulating a panel gap between the plates.

The columnar spacers have a side wall adapted to pre-align molecules of the liquid crystal surrounding each of the columnar spacers centering thereat. The columnar spacers have a diameter varying along its axis. The columnar spacers have a diameter decreasing or increasing toward one end thereof.

The side wall is adapted to pre-align molecules of the liquid crystal, e.g., substantially parallel to the side wall. The orientation layer is formed into a curved or slanted surface so as to orient molecules of the liquid crystal in a defined direction normal to the curved or slanted surface of the orientation layer.

The curved or slanted surface is formed into a recess or protrusion.

Other features and advantages of the present invention will be apparent from the following description taken in conjunction with the accompanying drawings, in which like reference characters designate the same or similar parts throughout the figures thereof.

PREFERRED EMBODIMENTS OF THE INVENTION

Figure 1:
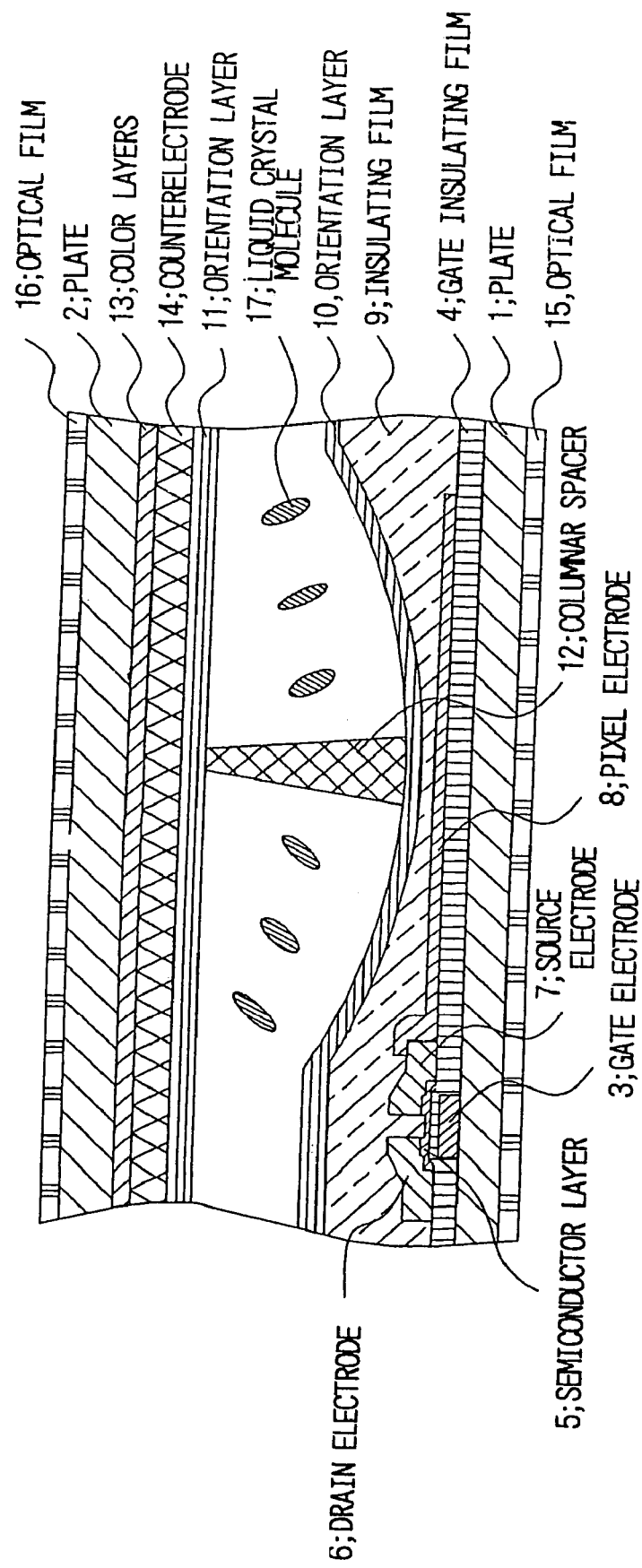
FIG. 1 is a sectional view showing one pixel of a liquid crystal display device according to a first embodiment of the present invention.

In a preferred mode of a multi-domain alignment liquid crystal display device, as shown in FIG. 1, a first plate 1 has a thin-film transistor provided at each point of intersection of a scanning line and signal line, a pixel electrode 8 connected to the thin-film transistor and an orientation layer 10 formed on the pixel electrode and defining a curved surface, a second plate 2 has three types of color layers 13 that corresponding to the three colors R, G, B, an counterelectrode 14 provided so as to oppose the pixel electrode 8, and an orientation layer 11, a columnar spacer 12 for regulating the panel gap is provided between the two opposing plates 1, 2, and liquid crystal is sandwiched between the two plates and subjected to multi-domain alignment by the orientation layer 10 having the curved surface and the columnar spacer.

Figure 7:
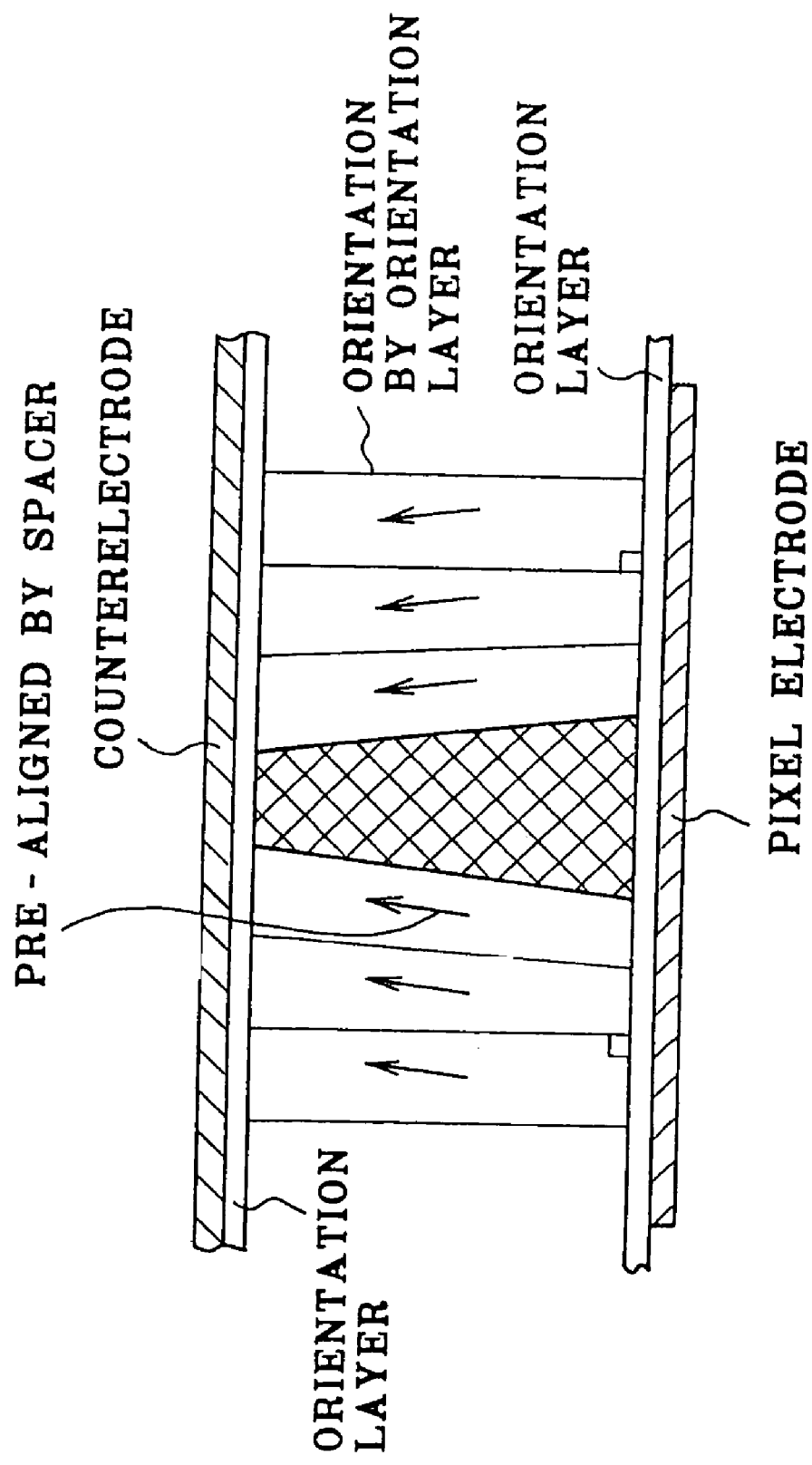
FIGS. 7 and 8 schematically illustrate the principle of multi-domain alignment according to the present invention, respectively.

FIG. 7 schematically illustrates the concept of the columnar spacer disposed at the center of the pixel electrode between two opposing electrodes (pixel- and counterelectrodes). By the provision of the columnar spacer the molecules of the liquid crystal in a region surrounding the spacer are pre-aligned in the direction marked by arrows. The basic (or background) orientation is determined by the orientation layers. In this case the orientation layers opposing each other orient the molecules of liquid crystal substantially normal to the surface plane of the orientation layer. The orientation direction of the orientation layer may be control led by, e.g., oblique deposition technique of certain material, e.g., SiO which causes oblique orientation to the orientation layer. In FIG. 7, the flux lines generally represent the basic orientation caused by the orientation layers.

The columnar spacer may or should have specific alignment properties of the liquid crystal molecules, either parallel, perpendicular or at angular relation to the side wall surface. The alignment properties may be determined and/or further emphasized by the dimensional shape or configuration and/or the nature of the material (alignment property, e.g., perpendicular or parallel to the surface thereof).

Figure 8:
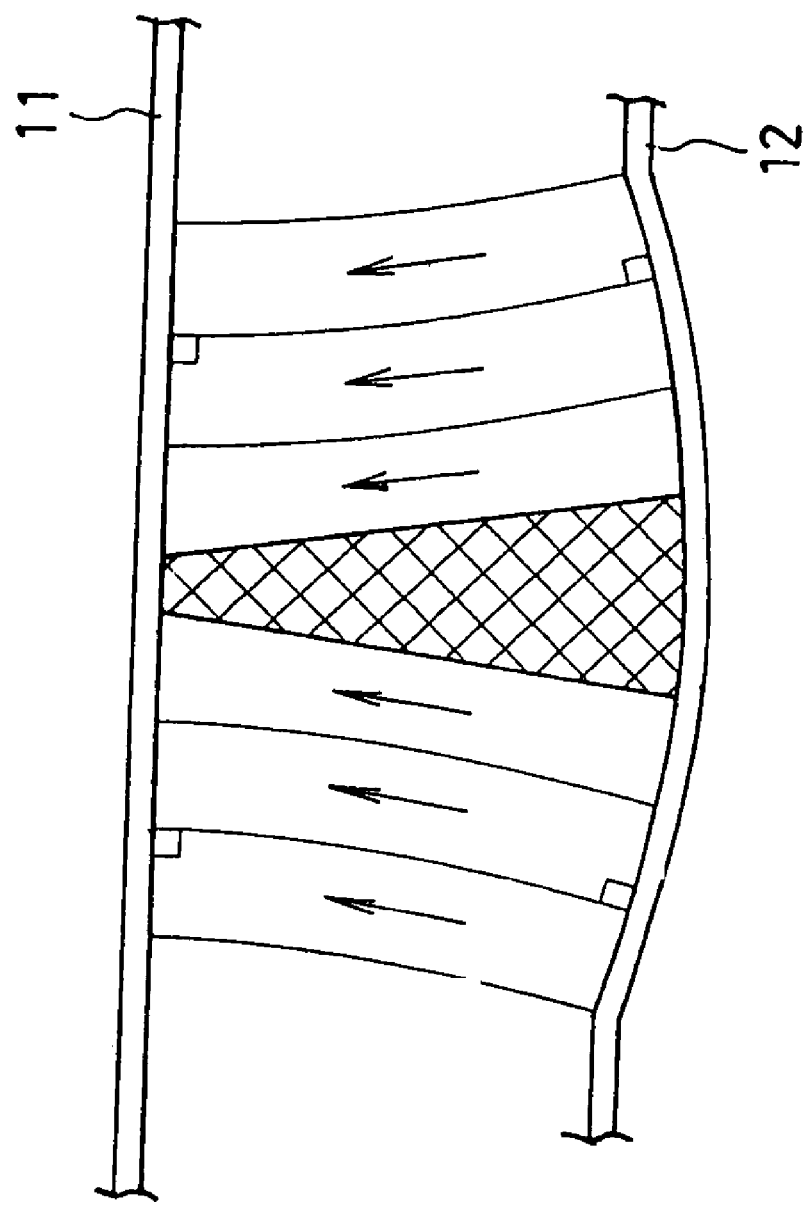

FIG. 8 schematically represents the basic concept of the combination of the curved orientation layer 12 and the columnar spacer. The flux lines represent the background orientation caused by the orientation layers 11 and 12, in which the orientation is established perpendicular to the layer surface. The columnar spacer, being disposed at the center of the recess, further stabilizes the background orientation surrounding the spacer to give multi-domain pre-alignment for one unit area (e.g., pixel).

If this alignment state is viewed from the top of the layer 11, there are observed optical multi-domains centered at the spacer for one pixel area.

This pre-aligned multi-domain formulation of the liquid crystal molecules provides a uniform gradation or tone of each pixel irrespective of the angle of view, i.e., in a wide angle of view.

Preferred embodiments of the present invention will now be described in detail with reference to the drawings.

First Embodiment

Figure 2:
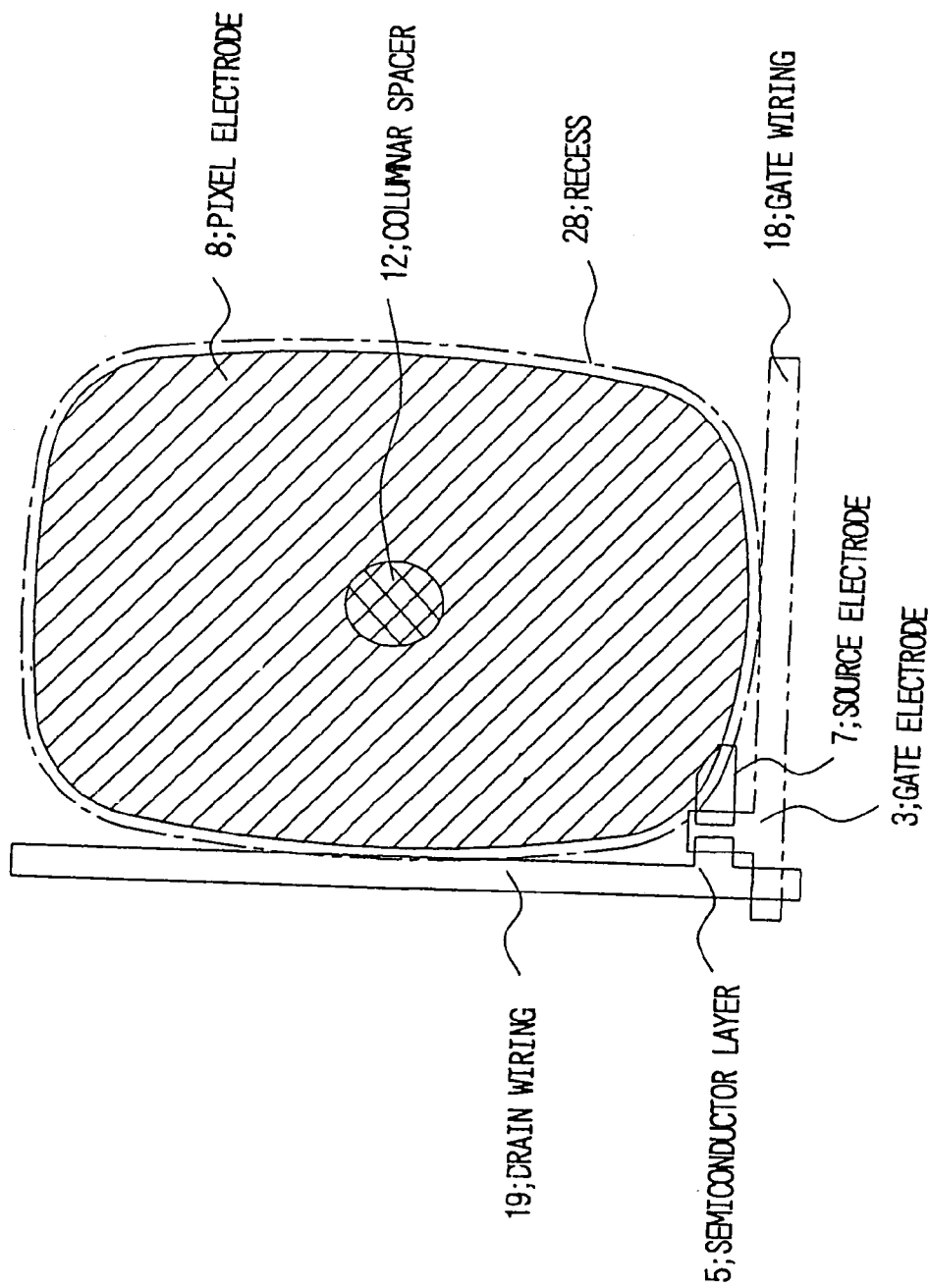
FIG. 2 is a plan view showing one pixel of a liquid crystal display device according to the first embodiment of the present invention.
Figure 3:
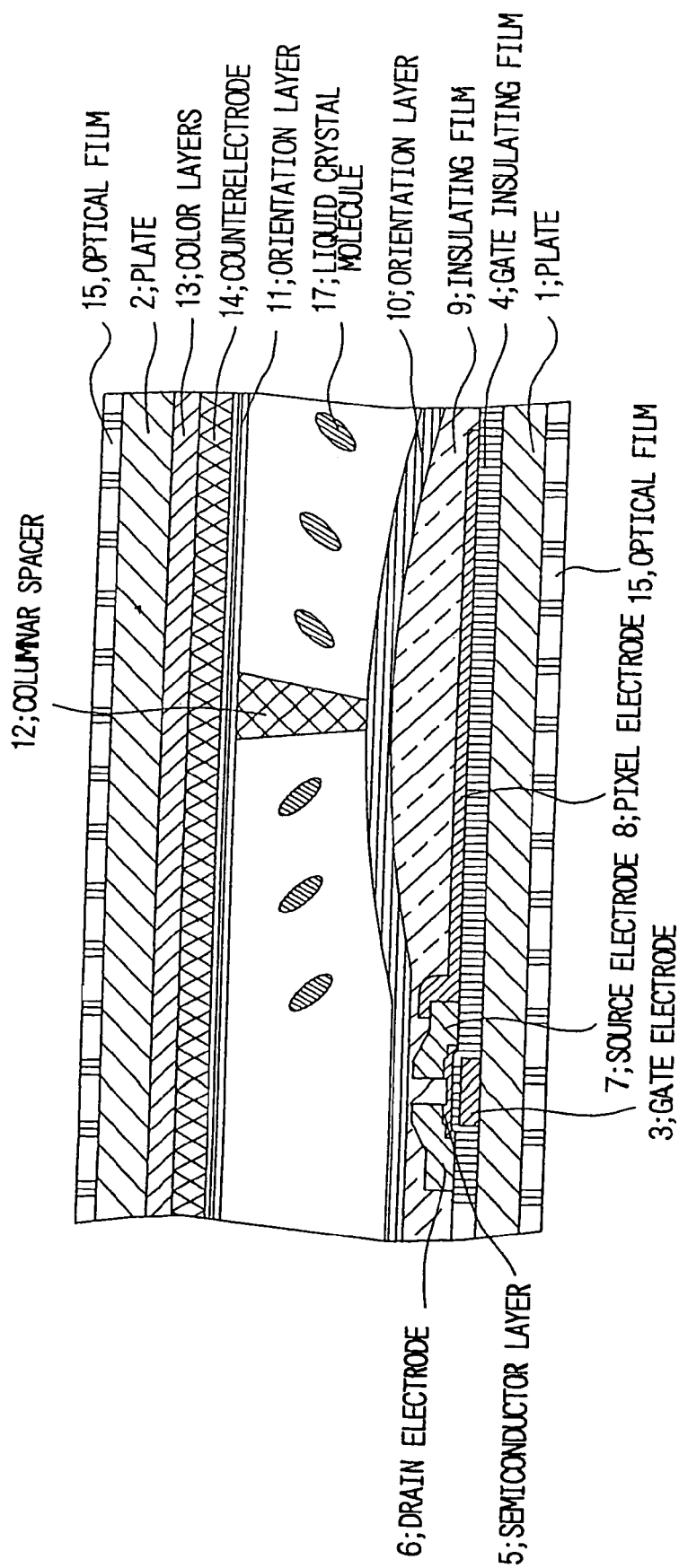
FIG. 3 is a sectional view showing one pixel of another structure of a liquid crystal display device according to the first embodiment of the present invention.

A liquid crystal display device according to a first embodiment of the present invention will be described with reference to FIGS. 1 to 3, in which FIG. 1 is a sectional view showing one pixel of a liquid crystal display device according to the first embodiment, FIG. 2 a plan view of the one pixel and FIG. 3 a sectional view showing one pixel of a liquid crystal display device in which the shape of the curved surface of an orientation layer differs from that of FIG. 1.

A method of manufacturing the liquid crystal device of the first embodiment will be described with reference to FIGS. 1 and 2. First, a gate electrode 3 and gate wiring 18, which comprise a single layer or multiple layers of a metal such as Cr or ITO, are formed on the transparent plate 1 such as glass by a process such as sputtering and a photoresist step, and a gate insulating film 4 comprising the two layers of silicon oxide and silicon nitride is formed on the gate electrode and gate wiring by a process such as CVD. A semiconductor layer 5 comprising amorphous silicon (a-Si, n+a-Si) is then formed by a processing (vapor deposition technique) such as CVD and a photoresist step, and a drain electrode 6, source electrode 7 and drain wiring 19, which comprise a single layer or multiple layers of a metal such as Cr or ITO, are formed by a process such as sputtering and a photoresist step. The steps described thus far form the drain wiring, gate wiring and a switching element. The wiring layer may extend in a direction substantially in agreement with the direction of a transmission axis of a polarizer provided on the first or second plate.

Next, the pixel electrode 8 comprising a transparent, electrically conductive film such as ITO is formed by a process such as sputtering etc. and a photoresist step. A recess is formed on the pixel electrode 8 by a transparent insulating film 9. Specifically, acrylic resin or polyimide resin, for example, is used as a thermoplastic material, a portion having a comparatively large film thickness is formed on the pixel electrode 8 by a photoresist process, and then the oblique (or curved) surface and bottom of the recess are formed utilizing the thermoplasticity of the material. Next, the orientation layer 10 comprising a transparent insulating film which causes liquid crystal molecules to align perpendicular to the film surface is formed on the insulating film 9. Specifically, polyimide resin SE-121 (manufactured by Nissan Kagaku K. K.) is applied to the insulating film 9 and the polyimide resin is heated (cured) under conditions that will suppress the thermoplasticity of the insulating film 9, thereby forming the orientation layer 10.

The columnar spacer 12 comprising an insulating film is formed substantially at the center of the recess. The columnar spacer 12 preferably is made of a material that will cause the liquid crystal molecules to align parallel to the surface of the spacer, and it is desired that the side surface of the spacer 12 be slanted or inclined. The direction of inclination is decided so as to agree with the direction in which the liquid crystal molecules are caused to slant by the recess. In this embodiment, it is preferred that the inclination of the side surface of the spacer 12 be such that the diameter (cross section) of the spacer will broaden in the direction toward the plate 1. Specifically, a column with vertical (upright or straight) side walls is formed from photosensitive acrylic resin or polyimide resin by a photoresist process. Then, when the column is heated for curing, the temperature is raised gradually to form the inclined surface (side wall). It is required that this process be performed under conditions that will suppress the thermoplasticity of the insulating film 9 so as to finally form the desired inclination.

The structure of the plate 2 on the opposite side of the device will now be described. If the device presents a color display, the color layers 13 are formed on the transparent plate 2, which consists of glass or the like. A transparent electrically conductive film and the counterelectrode 14, which comprises ITO, are formed on the color layer (s) 13 as by sputtering. Next, the orientation layer 11 comprising a transparent insulating film which orient the liquid crystal molecules to align perpendicular to the film surface is formed on the counterelectrode 14. Specifically, the orientation layer 11 is formed using polyimide resin SE-121 (manufactured by Nissan Kagaku K. K.).

Next, the plates (substrate) 1 and 2 with their orientation layers opposing each other are disposed substantially in parallel with a fixed spacing maintained between them by the columnar spacer 12, and the gap between them is filled with a liquid crystal material whose dielectric anisotropy is negative. The material used is MLC-6608 (Merck). In this embodiment, adding a hardening resin to the liquid crystal material is unnecessary. However, hardening resin may be added if desired, as set forth in Japanese Patent Kokai Publication JP-A-8-292423, (the entire disclosure thereof being incorporated herein by reference.)

Optical films 15, 16 are affixed to the outer-side surfaces of the plates 1 and 2. The optical films 15, 16 each comprise a polarizer or a combination of a polarizer and an optical compensation film. The polarizers affixed to the plates are arranged in such a manner that the light absorption axes thereof are orthogonal to each other.

In the embodiment described above, a recess is formed by the insulating film 9. However, a protrusion may be formed by the insulating film 9, as illustrated in FIG. 3. In this case the columnar spacer 12 is formed on the plate 2 and it is preferred that the columnar spacer 12 be formed in such a manner that its side surfaces be inclined in a direction that narrows the spacer in the direction toward the plate 1. Other components are the same as those shown in FIG. 1.

Though the planar structure of the pixel electrode 8 may be rectangular in general, a circular or oval shape is preferred if matching with the recess or protrusion is taken into consideration. It is also possible to adopt a composite shape such as the combination of rectangular and circular shapes shown in FIG. 2.

In terms of operation of the present Embodiment the following explanation is given. Now referring to FIG. 1, the pixel surface of the plate 1 defines a recess. In the initial state, which is devoid of applied voltage, the liquid crystal molecules are caused to orient generally perpendicular to the surface of the recess by the orientation layer 10. Accordingly, since the direction of an electric field produced when a potential difference develops across the pixel electrode 8 and counterelectrode 14 is substantially perpendicular to the surfaces of the plates, the direction of orientation of the liquid crystal molecules in the initial state tilts relative to the direction of the electric field.

This direction of tilt agrees with the direction of tilt of the liquid crystal molecules oriented parallel to the surface of the columnar spacer 12. Since the liquid crystal molecules exhibit negative dielectric anisotropy, they tilt in a direction perpendicular to the electric field when voltage is applied. In other words, the tilt is increased further in the initial direction of tilt, as indicated by the liquid crystal molecules 17 in FIG. 1. The transmittance of transmitted light is controlled by the angle of tilt. Since the liquid crystal molecules in one pixel tilt with the columnar spacer 12 (i.e., the axis thereof) serving as the axis of symmetry, the display characteristics of the respective directions of tilt compensate for each other even if the angle of sight (viewing angle) changes. This makes it possible to obtain a display in which there is little change in color at different viewing angles. The same effect can be obtained with the arrangement of FIG. 3 as well.

Second Embodiment

Figure 4:
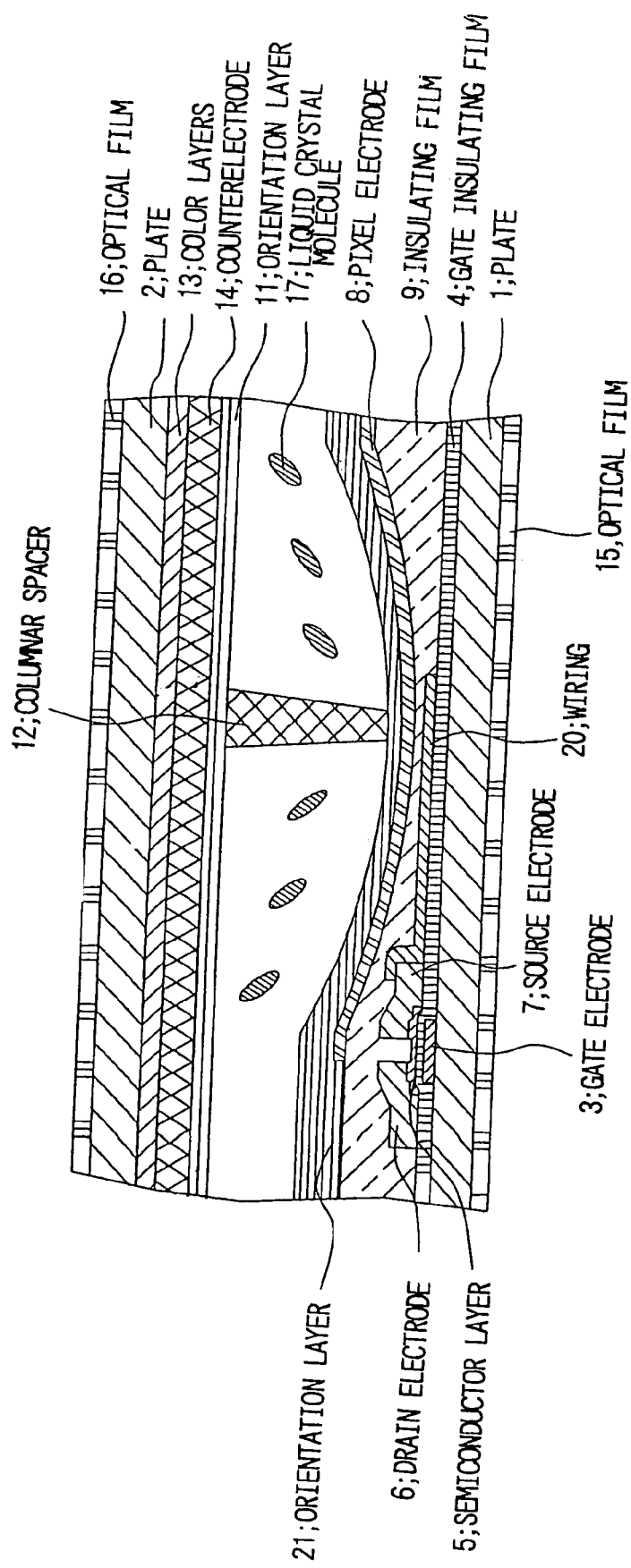
FIG. 4 is a sectional view showing one pixel of a liquid crystal display device according to a second embodiment of the present invention.
Figure 5:
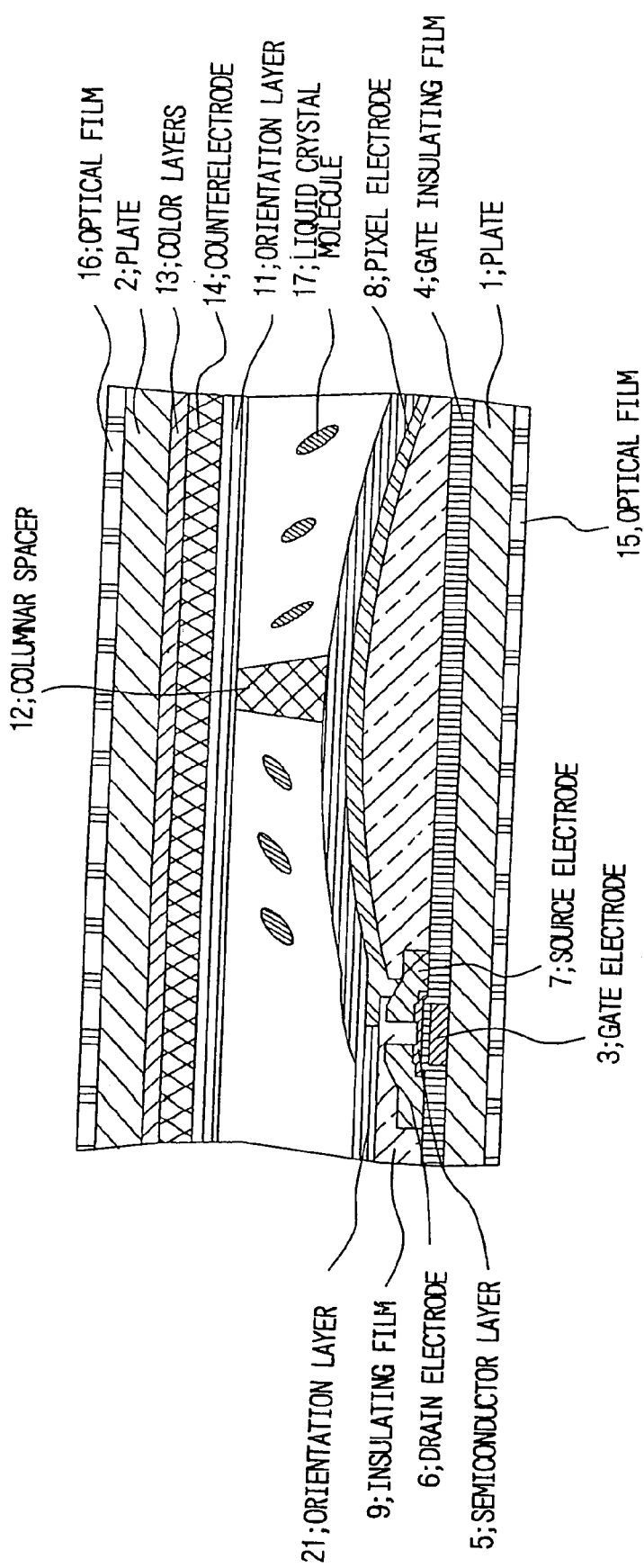
FIG. 5 is a sectional view showing one pixel of another structure of a liquid crystal display device according to the second embodiment of the present invention.
Figure 6:
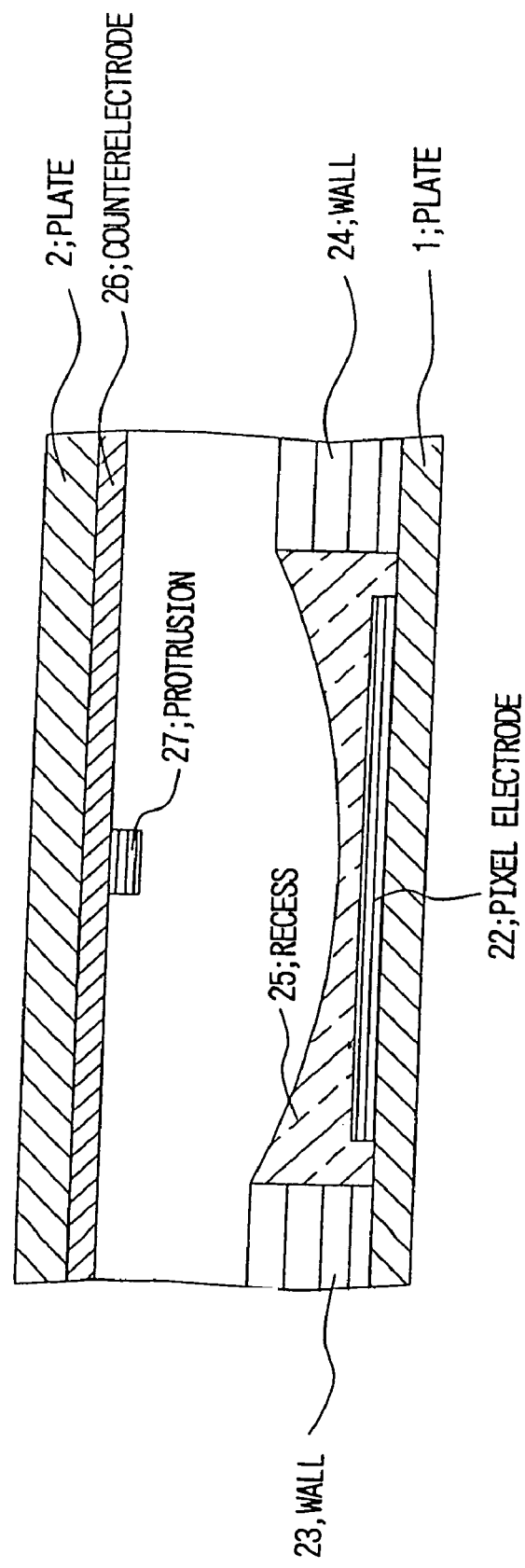
FIG. 6 is a sectional view showing one pixel of a liquid crystal display device according to the prior art.

A liquid crystal display device according to a second embodiment of the present invention will be described with reference to FIGS. 4 and 5, in which FIG. 4 is a sectional view showing one pixel of a liquid crystal display device according to the second embodiment, and FIG. 5 is a sectional view showing one pixel of a variant liquid crystal display device in which the shape of the curved surface of an orientation layer differs from that of FIG. 4.

The second embodiment differs from the first embodiment in that the pixel electrode 8 is provided on the insulating film 9 and basically defines the shape of a recess; wiring 20 is an electrically conductive film, preferably a transparent film so as not to block transmitted light, formed by a process such as sputtering and a photoresist step (here, using ITO) so as to electrically communicate the source electrode 7 and pixel electrode 8; a film which orients the liquid crystal molecules perpendicular to the horizontal plane of the plates is adopted as an orientation layer 21 (and is formed, here, by oblique vapor deposition of SiO); and the direction of inclination of the side surface (wall) of the columnar spacer 12 is such that the cross section of the columnar spacer 12 narrows in the direction toward the plate 1.

According to this arrangement, the pixel electrode 8 generally makes up or defines a recess. As a result, the electric field produced at application of voltage is not perpendicular to the horizontal plane of the plates but is nearly perpendicular to the curved surface of the recess. When the liquid crystal molecules would be oriented perpendicular to the curved surface in the initial state, therefore, as in the foregoing embodiment, the direction of orientation and the direction of the electric field substantially would coincide and the directions in which the liquid crystal molecules tilt would occur in random fashion, thus causing a faulty display. Accordingly, it is desired that the liquid crystal molecules be oriented perpendicular to the plane of the plates in the initial state.

In this arrangement, the direction of tilt of the liquid crystal molecule 17 differs from that of the first embodiment and, hence, the direction of inclination of the side surface of columnar spacer 12 also is changed accordingly. Further, the wiring 20 may be formed through a process the same as that used to fabricate the source electrode 7. In such case, use of a light-blocking electrically conductive film may be contemplated. However, a decline in transmittance can be suppressed by making the direction in which the wiring 20 extends agree with the direction of the light transmission axis of the polarizer as much as possible. Furthermore, by achieving electrical communication with the pixel electrode 8 at the bottom of the recess, it is unnecessary to separately provide an opening to effect such communication. This makes it possible to hold down any increase in the process load.

FIG. 5 illustrates a variant case in which the insulating film 9 is made a protrusion instead of a recess. Similar effects can be obtained with this arrangement as well. Further, in FIG. 5, the insulating film 9 is provided with a opening by a photoresist step in order to establish electrical communication between the source electrode 7 and the pixel electrode 8. However, depending upon the shape of the insulating film 9, the two electrodes can be communicated directly without forming an opening.

The present invention provides the effects described below.

The first effect is that the direction of alignment of the liquid crystal molecules can be regulated stably. The reason for this is that the columnar spacer is formed at the center of the recess or protrusion corresponding to a pixel, and the columnar spacer has a surface that slants in a direction that conforms to the direction in which the liquid crystal molecules are tilted. Furthermore, the liquid crystal molecules are oriented parallel to the slanted surface of the columnar spacer in the initial state. Since only a columnar spacer is present at the pixel portion of the device, faulty orientation or alignment does not readily occur.

A second effect is a smaller process load. The reason for this is that since the columnar spacer functions as both a column for regulating orientation of the liquid crystal molecules and a spacer for supporting (or retaining) the panel gap, the column and spacer can be formed by a single step. In addition, it is unnecessary to mix a hardening resin with a liquid crystal material in order for alignment of the liquid crystal to be achieved stably. This makes it possible to dispense with processes for phase separation and hardening.

As a result of the effects set forth above, it is possible to obtain, through a comparatively simple process, a liquid crystal display device having a wide viewing in which there is little variance in tonality or gradation of individual pixels observed mainly when the visual angle is changed.

As many apparently widely different embodiments of the present invention can be made without departing from the spirit and scope thereof, it is to be understood that the invention is not limited to the specific embodiments thereof except as defined in the appended claims.

It should be noted that other objects and aspects of the present invention will become apparent in the entire disclosure and that modifications may be done without departing the gist and scope of the present invention as disclosed herein and appended herewith.

Also it should be noted that any combination of the disclosed and/or claimed elements, matters and/or items may fall under the modifications aforementioned.

What is claimed is:

1. A multi-domain alignment active-matrix liquid crystal display device comprising;
   first and second transparent insulating plates arranged to oppose each other;
   said first plate having disposed thereon a plurality of scanning lines and a plurality of signal lines, thin-film transistors provided in the vicinity of intersections between the scanning lines and signal lines, and pixel electrodes connected to the thin-film transistors;
   said second plate having a black matrix provided with openings at areas that oppose said pixel electrodes, a color layer and counterelectrodes provided so as to oppose said pixel electrodes;
   a liquid crystal being sandwiched between the opposing first and second plates and being control led by voltage impressed across said pixel electrodes and said counterelectrodes;
   wherein an orientation layer is provided on each pixel electrode of said first plate via an insulating film,
   wherein said orientation layer is formed into a curved surface and orients molecules of the liquid crystal aligned in a direction normal to the curved surface of said orientation layer;
   wherein at least one columnar spacer having a diameter varying along its axis is provided between the two opposing plates for regulating a panel gap therebetween, said at least one columnar spacer disposed approximately at a center of a pixel,
   said orientation layer formed on said first plate defines a protrusion directed toward said second plate in a cross section taken along a line normal to said first plate; and
   wherein said columnar spacer has a diameter that becomes progressively larger in the direction toward said second plate.

2. A multi-domain alignment active-matrix liquid crystal display device comprising;
   first and second transparent insulating plates arranged to oppose each other;
   said first plate having disposed thereon a plurality of scanning lines and a plurality of signal lines, thin-film transistors provided in the vicinity of intersections between the scanning lines and signal lines, and pixel electrodes connected to the thin-film transistors;
   said second plate having a black matrix provided with openings at areas that oppose said pixel electrodes, a color layer and counterelectrodes provided so as to oppose said pixel electrodes;
   a liquid crystal being sandwiched between the opposing first and second plates and being control led by voltage impressed across said pixel electrodes and said counterelectrodes;
   wherein an orientation layer is provided on each pixel electrode of said first plate via an insulating film,
   wherein said orientation layer is formed into a curved surface and orients molecules of the liquid crystal aligned in a direction normal to the curved surface of said orientation layer,
   wherein at least one columnar spacer having a diameter varying along its axis is provided between the two opposing plates for regulating a panel gap therebetween, said at least one columnar spacer disposed approximately at a center of a pixel; and
   wherein liquid crystal molecules contiguous to the surface of the columnar spacer are aligned substantially parallel to the surface of said columnar spacer.

3. A multi-domain alignment active-matrix liquid crystal display device comprising;
   first and second transparent plates arranged to oppose each other;
   a liquid crystal being sandwiched between the first and second plates, and
   pixel electrodes disposed on one of said plates and counterelectrodes disposed on the other of said plates and adapted to apply voltage to the liquid crystal across the pixel electrodes and the counterelectrodes;
   wherein an orientation layer is provided on each pixel electrode of one of said plates via an insulating film,
   wherein said orientation layer is formed into a curved or slanted surface so as to orient molecules of the liquid crystal in a direction normal to the curved or slanted surface of said orientation layer, and
   wherein at least one columnar spacer is provided between the two opposing plates for regulating a panel gap between said plates, said at least one columnar spacer disposed approximately at a center of a pixel,
   said orientation layer defining a cavity recessed toward one of said plates,
   said columnar spacer having a side wall adapted to assist alignment of the liquid crystal molecules oriented by said orientation layer to secure multi-domain alignment thereof, and
   said orientation layer defines a protrusion directed toward one of said plates.

4. The device according to claim 3, wherein said columnar spacer has a side wall adapted to assist alignment of the liquid crystal molecules oriented by said orientation layer to secure multi-domain alignment thereof.

5. A multi-domain alignment active-matrix liquid crystal display device comprising;
   first and second transparent plates arranged to oppose each other;
   a liquid crystal being sandwiched between the first and second plates, and
   pixel electrodes disposed on one of said plates and counterelectrodes disposed on the other of said plates and adapted to apply voltage to the liquid crystal across the pixel electrodes and the counterelectrodes;

wherein an orientation layer is provided at least on each pixel electrode disposed on one of said plates; and wherein at least one columnar spacer having a side surface that is slanted or inclined is provided between the two opposing plates for regulating a panel gap between said plates, said at least one columnar spacer disposed approximately at a center of a pixel;

wherein said side surface of said at least one columnar spacer is adapted to pre-align molecules of the liquid crystal surrounding each of the columnar spacers centering thereat;

wherein said orientation layer is formed into a curved or slanted surface so as to orient molecules of the liquid crystal in a defined direction normal to the curved or slanted surface of said orientation layer.

6. The device according to claim 5, wherein said at least one columnar spacer has a diameter varying along its axis.

7. The device according to claim 5, wherein said at least one columnar spacer has a diameter decreasing or increasing toward one end thereof.

8. The device according to claim 5, wherein said side surface is adapted to pre-align molecules of the liquid crystal substantially parallel to the sidewall.

9. A multi-domain alignment active-matrix liquid crystal display device comprising;

first and second transparent plates arranged to oppose each other;

a liquid crystal being sandwiched between the first and second plates, and pixel electrodes disposed on one of said plates and counterelectrodes disposed on the other of said plates and adapted to apply voltage to the liquid crystal across the pixel electrodes and the counterelectrodes;

wherein an orientation layer is provided at least on each pixel electrode disposed on one of said plates, and wherein at least one columnar spacer is provided on said orientation layer between the two opposing plates for regulating a panel gap between said plates, said at least one columnar spacer disposed approximately at a center of a pixel;

wherein the orientation layer and the pixel electrode are convex-shaped: the orientation layer has an orientation direction controlled by oblique deposition of SiO to effect oblique orientation of the orientation layer; and the columnar spacer is normal to the device and has a diameter decreasing toward the counterelectrode opposing the pixel electrode.

10. The device of claim 9 wherein the orientation layer has an orientation direction controlled by oblique deposition of SiO to effect oblique orientation of the orientation layer.

11. The device of claim 9 wherein the columnar spacer is normal to the device and has a diameter increasing toward the counterelectrode opposing the pixel electrode.

12. The device of claim 9 wherein the orientation layer and the pixel electrode are concave-shaped; the orientation layer has an orientation direction controlled by oblique deposition of SiO to effect oblique orientation of the orientation layer; and the columnar spacer is normal to the device and has a diameter increasing toward the counterelectrode opposing the pixel electrode.

13. The device of claim 9 wherein the orientation layer and the pixel electrode are concave-shaped.

14. The device of claim 9 wherein the columnar spacer is normal to the device and has a diameter decreasing toward the counterelectrode opposing the pixel electrode.

* * * * *